*(12)* United States Patent
Nandigama et al.

(10) Patent No.: US 9,932,893 B2
(45) Date of Patent: Apr. 3, 2018

(54) BASE-FRAME ASSEMBLY FOR A COMBUSTION ENGINE

(71) Applicant: General Electric Company, Schenectady, NY (US)

(72) Inventors: Pavan Chakravarthy Nandigama, Bangalore (IN); Peter Watson, Garching b. Munchen (DE); Manikandan Suriyanarayanan, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 29 days.

(21) Appl. No.: 14/710,257

(22) Filed: May 12, 2015

(65) Prior Publication Data

US 2016/0333777 A1   Nov. 17, 2016

(51) Int. Cl.

| F16M 1/00 | (2006.01) |
|---|---|
| F02B 63/04 | (2006.01) |
| F16M 11/00 | (2006.01) |
| B22D 25/02 | (2006.01) |
| F16M 5/00 | (2006.01) |

(52) U.S. Cl.
CPC ........... *F02B 63/044* (2013.01); *B22D 25/02* (2013.01); *F16M 5/00* (2013.01); *F16M 11/00* (2013.01); *F02B 2063/045* (2013.01)

(58) Field of Classification Search
CPC . F02B 63/044; F02B 2063/045; F16M 11/00; F16M 5/00; B22D 25/02
USPC .......................... 248/638; 180/311; 52/167.7
See application file for complete search history.

(56) References Cited

U.S. PATENT DOCUMENTS

| 5,226,696 A | 7/1993 | Klages et al. |
|---|---|---|
| 6,212,749 B1 | 4/2001 | Chow et al. |
| 6,439,608 B1 * | 8/2002 | Bonnville .............. B62D 21/09 180/311 |
| 7,698,870 B2 * | 4/2010 | Murarescu ............... F16M 5/00 52/167.7 |
| 2004/0090413 A1 | 5/2004 | Yoo |
| 2010/0194145 A1 | 8/2010 | Akaki et al. |

FOREIGN PATENT DOCUMENTS

| GB | 415089 A * | 8/1934 | ............... F16M 5/00 |
|---|---|---|---|
| WO | 2004090413 A1 | 10/2004 | |

OTHER PUBLICATIONS

European Search Report and Written Opinion issued in connection with corresponding EP Application No. 16169002.9 dated Oct. 14, 2016.

* cited by examiner

*Primary Examiner* — Todd M Epps
(74) *Attorney, Agent, or Firm* — Fletcher Yoder, P.C.

(57) ABSTRACT

A system includes a cast mounting tower having an upper portion configured to support an engine, a generator, or any combination thereof and a plurality of ribs coupled to and supporting the upper portion of the mounting tower. The plurality of ribs extend from the upper portion in a direction crosswise to the upper portion, the upper portion and the plurality of ribs are integrally coupled as a one-piece structure of the cast mounting tower, and the cast mounting tower is configured to couple to a frame.

11 Claims, 4 Drawing Sheets

BASE-FRAME ASSEMBLY FOR A COMBUSTION ENGINE

BACKGROUND

The subject matter disclosed herein relates to systems for supporting combustion engines during various operations.

Combustion engines are used in many land and marine based applications. During overhaul and service (e.g., maintenance, repair, etc.) of the combustion engine, the combustion engine may need to be adjusted, transported, and/or removed from its base frame or location. This removal and/or transportation of the combustion engine may involve transferring the combustion engine between different support frames during the various stages of overhaul, or may involve removing the combustion engine from the support frame to enable ease of access for servicing various components of the engine. In addition, the various connections to the combustion engine may need to be connected and/or disconnected and the combustion engine realigned when reinstalled. All of these factors may increase the time of engine exchange, leading to engine down time that may result in lost revenue.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a cast mounting tower having an upper portion configured to support an engine, a generator, or any combination thereof and a plurality of ribs coupled to and supporting the upper portion of the mounting tower. The plurality of ribs extend from the upper portion in a direction crosswise to the upper portion, the upper portion and the plurality of ribs are integrally coupled as a one-piece structure of the cast mounting tower, and the cast mounting tower is configured to couple to a frame.

In accordance with a second embodiment, a system includes a support frame and a plurality of cast mounting towers coupled to the support frame. The plurality of cast mounting towers are configured to support an engine-driven generator.

In accordance with a third embodiment, a method includes casting a plurality of mounting towers for supporting an engine-driven generator. At least one tower of the plurality of mounting towers has an upper portion integrally coupled to a plurality of ribs as a one-piece structure, and the plurality of ribs extend from the upper portion in a crosswise direction relative to the upper portion.

BRIEF DESCRIPTION

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include at least partially cast structural support systems for supporting an engine-generator set, such as an electrical generator or gearbox driven by a combustion engine. The combustion engine may include a reciprocating piston engine having a plurality of pistons that reciprocate in respective cylinders. The system include a base that is fabricated from multiple pieces into a support frame assembly suitable for supporting and bearing the weight of the engine, the generator or gearbox, or the combination of both. The fabricated support frame may couple to the engine-generator set in a plurality of ways. One coupling includes mounting towers that attach at a number of points between the support frame assembly and the engine. The mounting towers may include towers that are also fabricated (e.g., welded) from multiple components. In another embodiment, however, the mounting towers may be cast and thus be constructed in one step, for a reduced amount of time and money, while also increasing stiffness. Furthermore, the mounting towers may be designed and assembled to tune the stiffness of the base-frame assembly.

Figure 1:
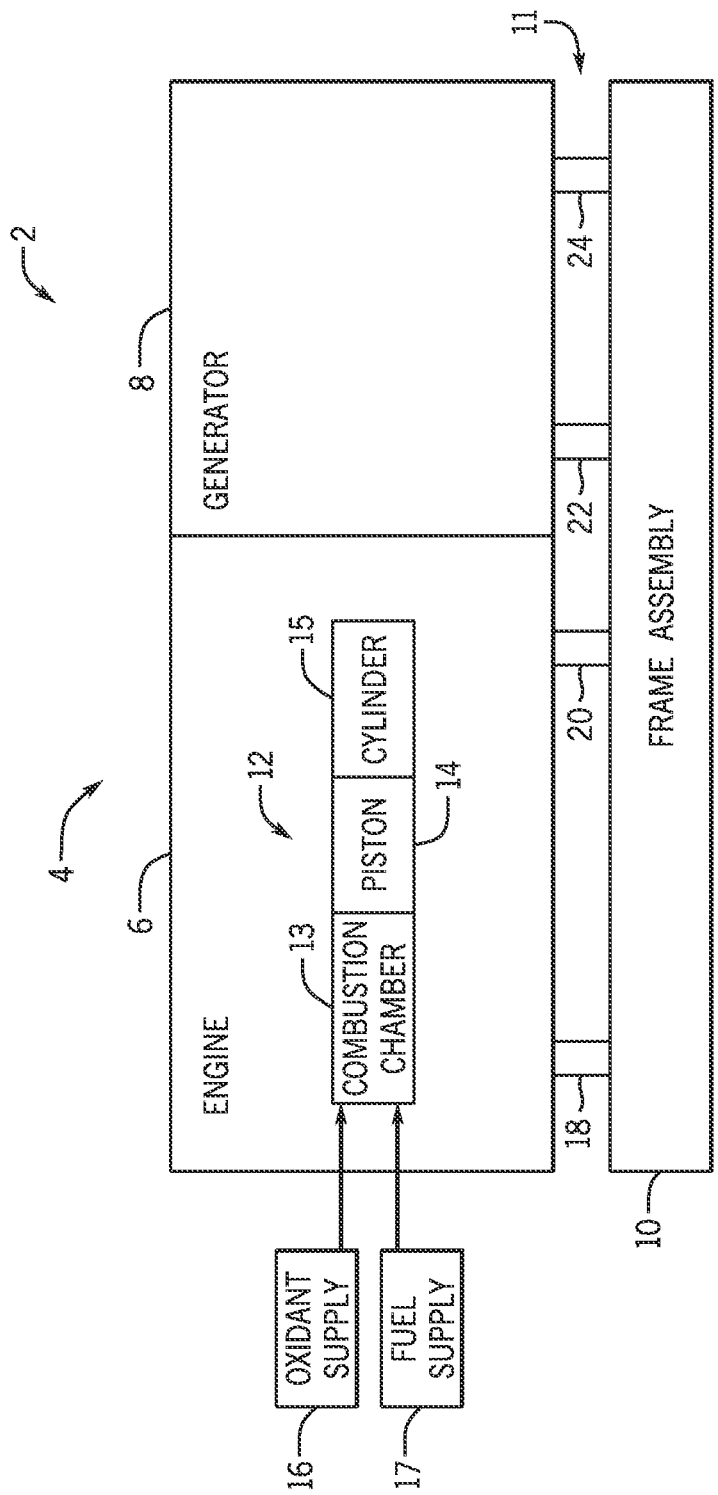
FIG. 1 is a schematic diagram of an embodiment of a base-frame assembly and engine-generator set.

FIG. 1 is a schematic diagram of an embodiment of a power generation system 2 having an engine generator set 4, which comprises a combustion engine 6 drivingly coupled to an electrical generator 8. As discussed in detail below, the engine-generator set 4 is coupled to and supported by a base-frame assembly 10, which includes a plurality of cast mounting towers 11 (e.g., formed as one-piece structures via a metal casting process).

In the illustrated embodiment, the engine 6 includes a reciprocating internal combustion engine having one or more combustion chambers 13, each defined by a piston 14 reciprocating in a respective cylinder 15. For example the engine 6 may include 1, 2, 3, 4, 5, 6, 7, 8, 10, 12, 14, 16, 18, 20, 22, 24, 26, or more combustion chambers 13, pistons 14, and cylinders 15. An oxidant supply 16 is configured to provide a pressurized oxidant 16, such as air, oxygen, oxygen-enriched air, oxygen-reduced air, or any combination thereof, to each combustion chamber 14. The combustion chamber 14 is also configured to receive a fuel 17 (e.g., a liquid and/or gaseous fuel) from a fuel supply 17, and a fuel-oxidant mixture ignites and combusts within each combustion chamber 13. The hot pressurized combustion gases cause a piston 14 adjacent to each combustion chamber 13 to move linearly within the cylinder 15 and convert pressure exerted by the gases into a rotating motion, which causes a shaft to rotate. Further, the shaft may be coupled to a load, e.g., the electrical generator 8, which is powered via rotation of the shaft. In certain embodiments, the fuel 17 may be any suitable gaseous fuel, such as natural gas, associated petroleum gas, propane, biogas, sewage gas, landfill gas, coal mine gas, for example. Although the illustrated embodiment depicts the engine 6 as a reciprocating internal combustion engine, certain embodiments of the engine 6 may include, for example, a gas turbine engine, a steam turbine engine, a rotary engine, or any other engine able to drive the generator 8.

The system 2 disclosed herein may be adapted for use in stationary applications (e.g., in industrial power generating engines) or in mobile applications (e.g., mobile power distribution unit, such as a semi-truck trailer mounted power generation system 2, or marine power generation systems 2). Mobile applications may also include embodiments where the power generating engines directly drive the movement (e.g., land or marine based drive trains) The engine 6 (e.g., reciprocating piston engine) may be a two-stroke engine, three-stroke engine, four-stroke engine, five-stroke engine, or six-stroke engine. The engine 6 may also include any number of combustion chambers 13, pistons 14, and associated cylinders 15 (e.g., 1-24). For example, in certain embodiments, the system 2 may include a large-scale industrial reciprocating engine having 4, 6, 8, 10, 16, 24 or more pistons 14 reciprocating in cylinders 15. In some such cases, the cylinders 15 and/or the pistons 14 may have a diameter of between approximately 13.5-34 centimeters (cm). In some embodiments, the cylinders 15 and/or the pistons 14 may have a diameter of between approximately 10-40 cm, 15-25 cm, or about 15 cm. The system 2 may generate power ranging from 10 kW to 10 MW. In some embodiments, the engine 6 may operate at approximately 1800 revolutions per minute (RPM), particularly for engines 6 powering a grid that operates at 60 Hz. Other embodiments may operate at approximately 1500 RPM, particularly for engines 6 powering a grid that operates at 50 Hz. In some embodiments, the engine 6 may operate at less than approximately 2000 RPM, 1900 RPM, 1800 RPM, 1700 RPM, 1650 RPM, 1500 RPM, 1400 RPM, 1300 RPM, 1200 RPM, 1000 RPM, or 900 RPM. In some embodiments, the engine 6 may operate between approximately 800-2000 RPM, 900-1800 RPM, or 1000-1600 RPM. In some embodiments, the engine 6 may operate at approximately 1800 RPM, 1500 RPM, 1200 RPM, 1000 RPM, or 900 RPM. Exemplary engines 6 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The engine 6, as illustrated, is attached to the frame assembly 10 by a plurality of mounting towers 11, e.g., front engine mounting towers 18 and back engine mounting towers 20. Likewise, the generator 8 is attached to the frame assembly 10 by a plurality of mounting towers 11, e.g., front generator mounting towers 22 and back generator mounting towers 24. Each of the mounting towers 18, 20, 22, 24 may be cast rather than fabricated (e.g., through a welding process). Casting the mounting towers 18, 20, 22, 24 rather than fabricating, assembling, or welding has the benefits of increased stiffness, reduced cost, and wider application for multiple frame assemblies, and the ability to slide the generator 8 or the engine out of the operating position for service. Furthermore, the mounting towers 18, 20, 22, 24 may be cast from the same mold or in the same model, enabling the mounting towers 18, 20, 22, 24 to be installed or replaced interchangeably. In other words, the casting of the mounting towers 11 may produce one or more modular towers, which are substantially uniform or identical. The casting of the towers 11 also may enable casting of multiple (e.g., 2, 3, 4, or more) adjacent towers as a single, one-piece structure.

Figure 2:
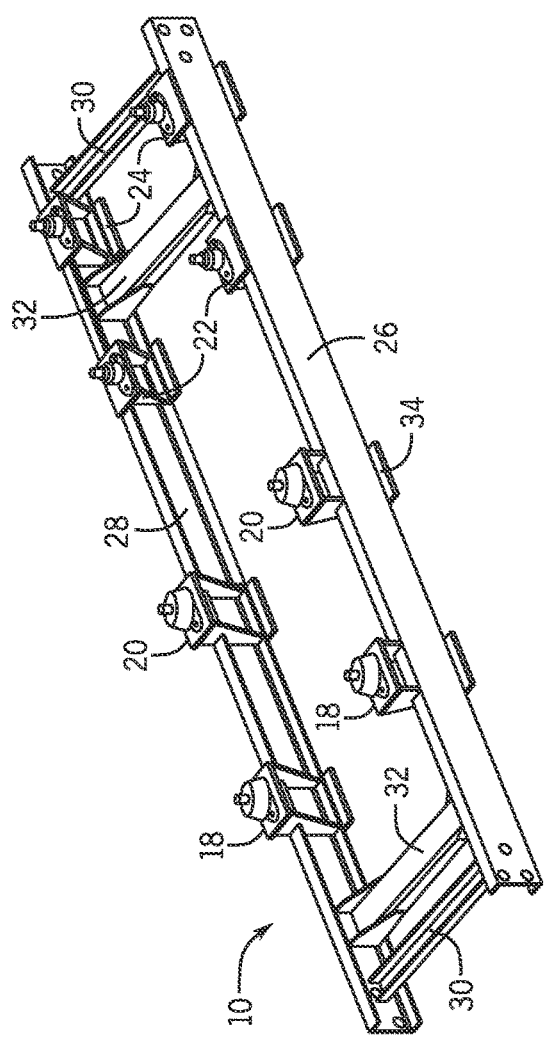
FIG. 2 is a perspective view of an embodiment of a base-frame assembly having four engine cast mounting towers and four generator cast mounting towers.

FIG. 2 is a perspective view of an embodiment of a base-frame assembly having four engine cast mounting towers 18, 20 (e.g., one-piece cast metal towers) and four generator cast mounting towers 22, 24 (e.g., one-piece cast metal towers). The frame assembly is fabricated with a right side-beam 26 and a left side-beam 28. The side-beams 26, 28 support the mounting towers 18, 20, 22, 24 and maintain the relative position between the mounting towers 18, 20, 22, 24, which may change depending on the engine or generator that the frame assembly 10 is supporting. FIG. 2 illustrates that any number of engine mounting towers 18, 20 may be coupled to the side-beams 26, 28. For example, the side-beams 26, 28 of the frame assembly 10 may include 2, 3, 4, 5, 6, 8, 10 or more engine mounting towers 18, 20. Similarly, the generator 8 may be supported by any number of generator mounting towers 22, 24. For example, the frame assembly 10 may include 2, 3, 4, 5, 6, 8, 10 or more generator mounting towers 22, 24. The number of mounting towers 18, 20, 22, 24 may depend upon the relative size of the generator 8 or the engine 6 that the mounting towers 18, 20, 22, 24 are supporting, or the number of mounting towers 18, 20, 22, 24 may depend upon the type of generator 8 or engine 6. The frame assembly also includes jacking bars 30 and crossmembers 32 that couple the side-beams 26, 28 and define the width of the frame assembly 10. The jacking bars 30 and the crossmembers 32 may be fabricated and then subsequently welded or bolted to the side beams 26, 28 to form the frame assembly 10. The frame assembly 10, as illustrated, includes foot plates 34 installed underneath each mounting tower 18, 20, 22, 24 to augment the strength of the mounting tower 18, 20, 22, 24 to support the generator 8 and the engine 6. The foot plates 34 may be constructed from metal or elastomeric material to secure the mounting towers 18, 20, 22, 24 and the frame assembly 10 to the ground. That is, the foot plates 34 may be bolted to the ground to stiffly anchor the mounting towers 18, 20, 22, 24.

Figure 3:
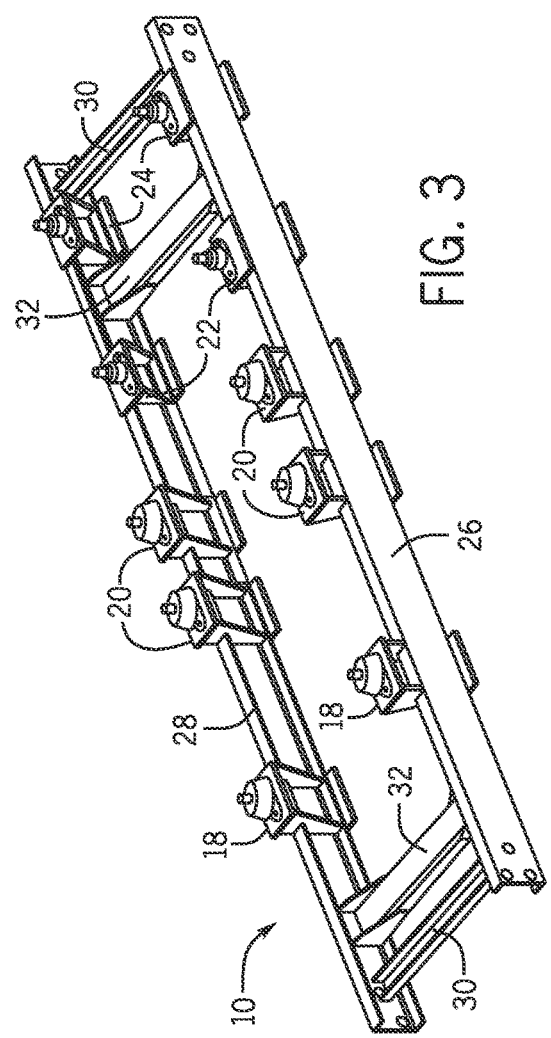
FIG. 3 is a perspective view of an embodiment of a base-frame assembly having six engine cast mounting towers and four generator cast mounting towers.

FIG. 3 is a perspective view of an embodiment of a base-frame assembly 10 having six engine cast engine mounting towers 18, 20 and four generator cast mounting towers 22, 24. FIG. 3 also illustrates that any number of engine mounting towers 18, 20 may be coupled to the side-beams 26, 28. For example, the side-beams 26, 28 of the frame assembly 10 may include 2, 3, 4, 5, 6, 8, 10 or more engine mounting towers 18, 20. Similarly, the generator 8 may be supported by any number of generator mounting towers 22, 24 as a platform for the generator and the frame assembly 10. For example, the frame assembly 10 may include 2, 3, 4, 5, 6, 8, 10 or more generator mounting towers 22, 24. The generator mounting towers 22, 24 may be evenly spaced or may be focused on supporting one or more specific areas of the generator 8. The mounting towers 22, 24 enable ease of access of the generator 8 and ease of removal for service or replacement.

In certain embodiments, two or more of the mounting towers 18, 20, 22, 24 may be paired and/or connected with each other to further increase stiffness and speed of replacement or adjustment of the frame assembly 10. For example, each of the engine mounting towers 18, 20 may be connected together, and/or each of the generator mounting towers 22, 24 may be connected together. The group of mounting towers 18, 20, 22, 24, may include the crossmembers 32 and or the jacking bars 30 which may consolidate the multiple pieces into a single assembly. Furthermore, the group may include one crossmember 32 and/or jacking bar 30 per pair of mounting towers 18, 20, 22, 24, two crossmembers 32 and/or jacking bars 30 per pair of mounting towers 18, 20, 22, 24, more crossmembers 32 and/or jacking bars 30, or one crossmember 32 or jacking bar 30 for every two pairs of mounting towers 18, 20, 22, 24. The mounting towers 18, 20, 22, 24 and the crossmembers 32/jacking bars 30 may be assembled (i.e., welded together) or, in some embodiments, may be cast together as one piece paragraph about a pair or a couple pairs of towers may be combined with the crossmembers 32.

Figure 4:
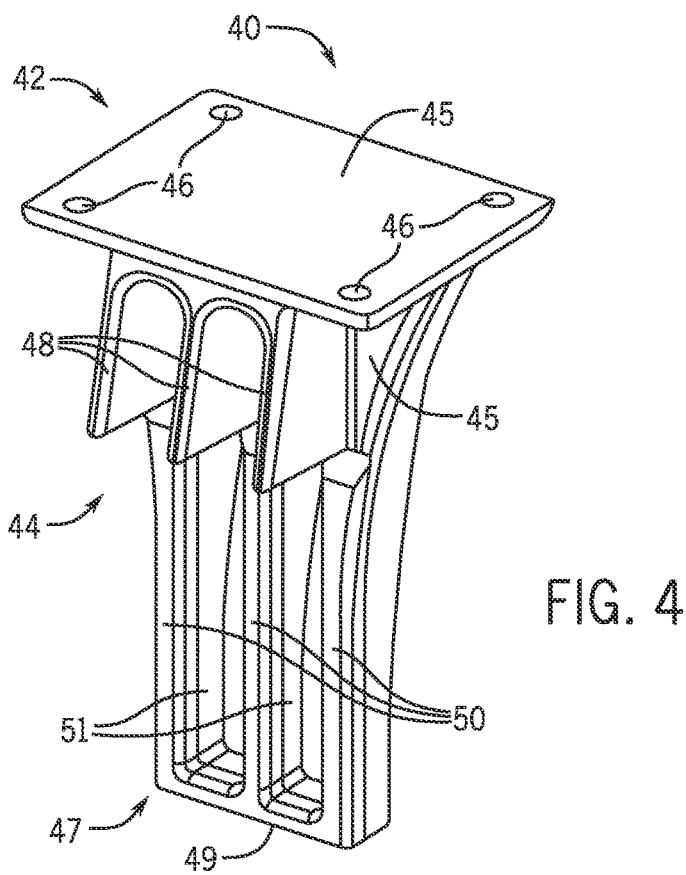
FIG. 4 is a perspective view of an embodiment of a cast mounting tower.

FIG. 4 is a perspective view of an embodiment of a cast mounting tower 40 (e.g., a one-piece cast metal tower). The cast mounting tower 40 may be installed as any one of, or all of, the engine mounting towers 18, 20, or the generator mounting towers 22, 24. The cast mounting tower 40 includes an upper mount portion 42 and structural support ribs 44, which support the upper portion 42 and are used to attach the mounting tower 40 to the side-beam 26, 28 of the frame assembly 10. As illustrated, the ribs 44 may extend in a crosswise direction (e.g., perpendicular) from the upper portion 42 of the mounting tower 40. The upper portion 42 of the mounting tower 40 may include a mount 45 for direct coupling of the mounting tower 40 to the generator 8 or engine 6. The mount 45 (e.g., plate or planar structure) may include holes 46 corresponding to bolts that enable the generator 8 or the engine 6 to be bolted to the mounting tower 40. The generator 8 and the engine 6 may also be attached to the mounting tower 40 in other ways as well. For example, the mounting tower 40 may be attached by welding, clamping, strapping, male-female joints or fasteners, gluing, bonding, or any other appropriate mount or fastener.

The ribs 44 of the mounting tower 40 support the upper portion 42 of the mounting tower 40 and are attached to the frame assembly 10. The ribs 44 may be attached to the frame assembly 10, via a weld, bolts, clamps, male-female joints, dovetail joints, hook-in-slot joints, or any combination thereof. The number of ribs is not limited by the illustrated embodiment. That is, while FIG. 4 illustrates a mounting tower 40 with three ribs 44, other embodiments may include 1, 2, 3, 4, 5, 6, 7, 8, 9, 10, or more ribs 44 to support the upper portion 42 of the mounting tower 40 and attach the mounting tower 40 to the frame assembly 10. The ribs 44 are cast together with the upper portion 42 and may be shaped to follow specific contours or shape associated with the frame assembly 10. For example, the mounting tower 40 illustrated in FIG. 4 is cast to form a top section 48 and a bottom section 50 of ribs 44. The top section 48 of ribs 44 (e.g., upper ribs 48) rest on top of the side-beam 26, 28 onto which the mounting tower 40 is attached. The bottom section 50 of ribs 44 (e.g., lower ribs 50) extends past the top of the side-beam 26, 28 and may attach to the bottom of the side-beam 26, 28, may rest on the ground under the side-beam 26, 28, or may rest on the foot plates 34 installed underneath each mounting tower 40. As appreciated, the cast construction of the tower 40 creates a one-piece metal structure having all components of the tower 40, including the upper mount portion 42 and structural supports or ribs 44. The integral casting of the ribs 44 with the upper mount portion 42 increases rigidity and stiffness, and a vibration damping capability of the tower 42. As illustrated the upper ribs 44, 48 are integrally coupled to the mount portion 42 and an upper mount 45. The mount 45 in turn integrally couples with the ribs 44, 50. The lower ribs 44, 50 are integrally coupled together to define a framework 47, e.g., ribs 44, 50, mount 45, and lower body 49. The framework 47 has a plurality of openings 51 between the ribs 44, 50. In certain embodiments, the openings 51 may interface with corresponding features on the side-beam 26, 28 to which the mounting tower 40 is integrally coupled. The interface of the openings 51 may increase rigidity and stiffness of the coupling.

Figure 5:
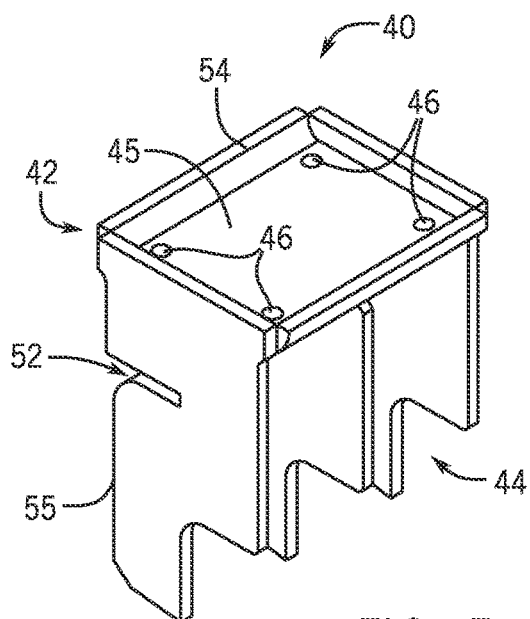
FIG. 5 is a perspective view of an embodiment of a cast mounting tower having a notch.

FIG. 5 is a perspective view of an embodiment of a cast mounting tower 40 having a mounting recess or notch 52 (e.g., female mounting portion). The cast mounting tower 40 includes planar ribs 44 that may be shaped to match a corresponding mounting surface on the side-beam 26, 28 to which it is integrally coupled. In certain embodiments, the ribs 44 may include the notch 52 to form around a part of the side-beam 26, 28 of the frame assembly 10. The notch 52, as illustrated, may form an elongated slit, such that a plate or other thin part of the side-beam 26, 28 may be installed within the notch 52. In other embodiments, the notch 52 may have a wider shape, corresponding to a round or square-shaped side-beam 26, 28. More specifically, as explained in detail below, the notch 52 matches the shape of the side-beam 26, 28 to increase security of the connection between the mounting tower 40 and the side-beam 26, 28. Thus, the notch 52 engages the side-beam 26, 28 to form a male-female joint. Furthermore, as explained in detail below with regard to FIG. 7, the ribs 44 may include a lower portion 55 that is formed to fit within a corresponding receiving cavity. To augment security between the mounting tower 40 and the generator 8 or the engine 6, the upper portion 42, as illustrated, may include a rim 54 (e.g., rectangular lip) around the mount 45. The rim 54 may hold resin to better accommodate resin chocking of the mount 45 to the generator 8 or the engine 6. The mount 45 may also include mounting holes 46 (e.g., bolt holes) or other appropriate mounts or fasteners.

Figure 6:
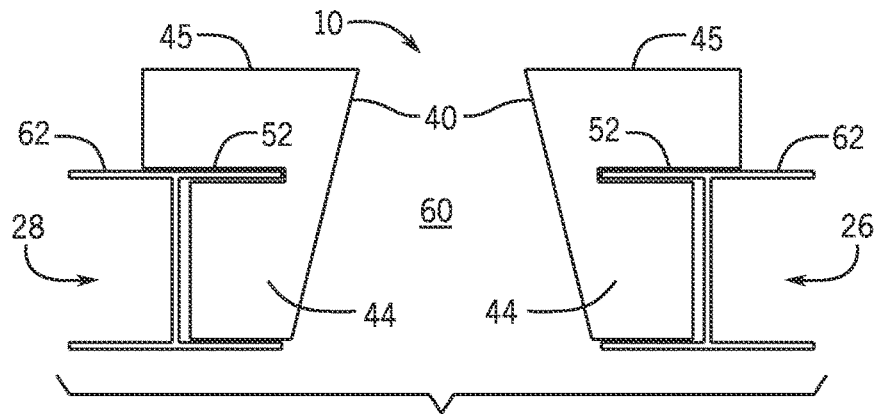
FIG. 6 is a cross-sectional end view of an embodiment of a base-frame assembly having I-shaped side beams.

FIG. 6 is a cross-sectional front end view of an embodiment of a base-frame assembly 10 having I-shaped side beams 26 28. The frame assembly 10 includes a cast mounting tower 40 (e.g., one-piece cast metal tower) on each side-beam 26, 28 mounted in an interior side 60 of each side-beam 26, 28. Mounting the cast mounting towers 40 on the interior 60 may be desirable in some instances where the ribs 44 exert an outward force against the frame assembly 10. Also, as illustrated in FIG. 6, the cast mounting tower 40 includes the notch 52, which extends around top and bottom sides of an upper plate 62 of the I-shaped side beams 26, 28. The cast mounting tower 40 may be welded to the upper plate 62 to increase the strength or stiffness of the connection. The cast mounting tower 40 illustrated in FIG. 6 illustrates an embodiment of a rigid mounting configuration. This is different from a resilient mounting explained with regard to FIG. 7.

Figure 7:
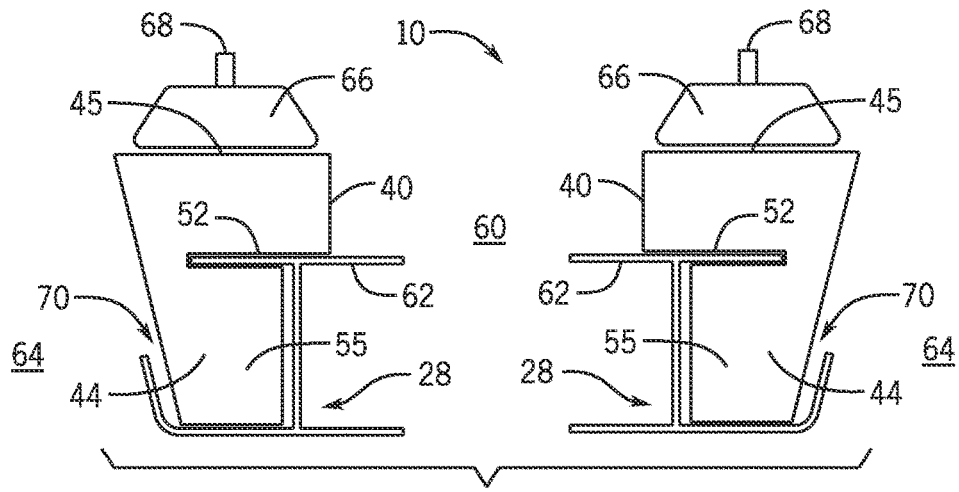
FIG. 7 is a cross-sectional end view of an embodiment of a base-frame assembly having C-shaped side beams.

FIG. 7 is a cross-sectional front end view of an embodiment of a frame assembly 10 having I-shaped side beams 26, 28. The frame assembly 10 includes a cast mounting tower 40 on each side-beam 26, 28 mounted in an exterior side 64 of each side-beam 26, 28. Mounting the mounting towers 40 on the exterior 64 may be desirable in some instances where the ribs 44 exert an inward force against the frame assembly 10. Similar to the embodiment illustrated in FIG. 6, the cast mounting tower 40 of FIG. 7 includes the notch 52, which extends around top and bottom sides of an upper plate 62 of the I-shaped side beams 26, 28. The mounting tower 40 may be welded to the upper plate 62 to increase the strength or stiffness of the connection. The mounting tower 40 illustrated in FIG. 7 has an embodiment of a resilient mounting configuration. This is different from the rigid mounting explained with regard to FIG. 6. For a resilient mounting, the mounting tower 40 includes a cushion 66 (e.g., shock absorber, vibration damper, or resilient material) and a guiding rod 68 between the mount 45 and the generator 8 or the engine 6. The cushion 66 damps or softens vibrations and other movement of the generator 8 or the engine 6 during operation. The cushion 66 may be integrally coupled to the cast mounting tower 40, or may be cast as part of the one-piece design for the cast mounting tower 40. For example, the cushion 66 may be formed as a spring during casting of the cast mounting tower 40. In the illustrated embodiment, the guiding rod 68 fits within a corresponding guide hole to help the generator 8 and/or the engine 6 maintain correct alignment over the mounting tower 40.

As mentioned above, the cast mounting tower 40 includes a bottom male portion 55 that fits within a corresponding cavity 70 that is part of the side-beam 26, 28. The cavity 70 may be formed from a band of metal such that it extends around only one of the ribs 44, or may be fabricated to run the entire length of the side-beam 26, 28 thus forming a channel into which all the ribs 4 from all the cast mounting towers 40 are installed. The cavity 70 may be deeper or shallower than the illustrated embodiment based on desires for stiffness and security.

Figure 8:
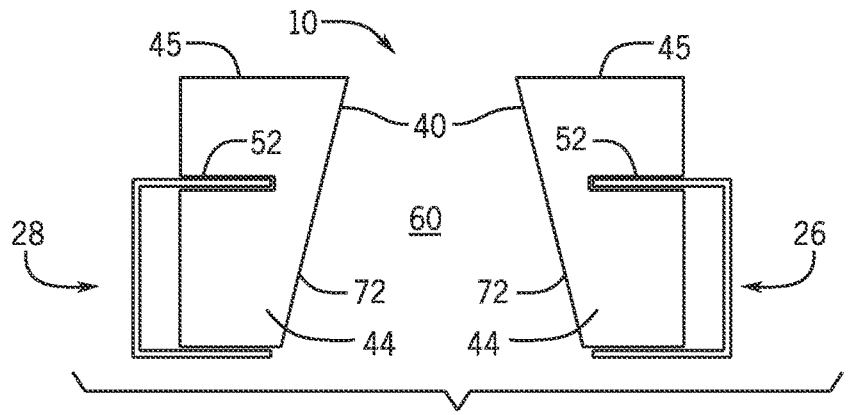
FIG. 8 is a cross-sectional end view of an embodiment of a base-frame assembly having I-shaped side beams.

FIG. 8 is a cross-sectional end view of an embodiment of a base-frame assembly having C-shaped side beams 26, 28. As with FIG. 6, the mounting tower 40 of FIG. 8 illustrates an embodiment of rigid mounting. The mounting towers 40 are installed on the interior 60 side of the frame assembly 10 and the notch 52 receives a portion of each side-beam 26, 28. As with the embodiments above, the mounting towers 40 are cast to match the specific characteristics for each location, and the mounting towers 40 may be interchangeably installed for any position below the generator 8, or the engine 6.

Furthermore, the angle of installation may change with different designs. For example, as illustrated, the cast mounting tower 40 may be installed with the notch 52, the mount 45, and the bottom of the cast mounting tower 40 parallel to the ground. In other embodiments, the cast mounting tower 40 may be installed with a back side 72 of the ribs 44 perpendicular to the ground. In such an embodiment, the notch 52 and the mount 45 etc. may be installed at an angle. For example, the mount 45 may be installed at an angle between about 15-90 degrees, 30-60 degrees, 30-45 degrees, or other angles to support the engine-generator set 4.

Technical effects of the disclosed embodiments include a fabricated frame assembly 10 that includes a plurality of mounting towers 11, 18, 20, 22, 24, 40 that are cast as one-piece structures to particular characteristics that match the specifics for each installed location. The mounting towers 18, 20, 22, 24, 40 may include an upper portion 42 and a plurality of ribs 44 extending below the upper portion 42 that support the upper portion 42 and attach the mounting tower to the side-beam 26, 28. The upper portion 42 and ribs 44 are integrally formed as one-piece, thereby increasing stiffness, rigidity, and reliability of the cast mounting towers 44. The cast mounting towers 44 also contribute significantly to the overall stiffness of the frame assembly 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a cast mounting tower, comprising:
      an upper portion configured to support an engine, a generator, or any combination thereof;
      a plurality of ribs coupled to and supporting the upper portion of the mounting tower, wherein the plurality of ribs extend from the upper portion in a direction crosswise to the upper portion, the upper portion and the plurality of ribs are integrally coupled as a one-piece structure of the cast mounting tower, and the cast mounting tower is configured to couple to a frame, and wherein the cast mounting tower comprises a female joint portion, a male joint portion, or a combination thereof, configured to interface with a respective joint portion of the frame; and
      a vibration damper disposed along a mount of the upper portion.

2. The system of claim 1, comprising the frame having a plurality of interconnected beams.

3. The system of claim 1, wherein the plurality of ribs comprises at least three ribs.

4. The system of claim 1, wherein the upper portion comprises a first guide configured to interface with a second guide of the engine or the generator.

5. A system, comprising:
   a support frame; and
   a plurality of cast mounting towers coupled to the support frame, wherein the plurality of cast mounting towers are configured to support an engine-driven generator, wherein at least one tower of the plurality of cast towers comprises a male joint portion interfacing with a respective joint portion of the support frame, and wherein the at least one tower of the plurality of cast towers comprises the male joint portion disposed between opposite plates of a beam of the support frame.

6. The system of claim 5, wherein the plurality of cast mounting towers comprises a first set of cast mounting towers configured to support an engine and a second set of cast mounting towers configured to support the engine-driven generator.

7. The system of claim 5, wherein the support frame comprises a plurality of I-beams, C-beams, or a combination thereof.

8. The system of claim 5, wherein the at least one tower of the plurality of cast towers comprises an upper mounting portion integrally coupled to a plurality of ribs as a one-piece structure.

9. The system of claim 5, comprising an engine and the engine-driven generator, wherein at least one of the engine or the engine-driven generator is supported by the plurality of cast mounting towers on the support frame.

10. The system of claim 9, wherein the engine comprises a reciprocating piston engine.

11. A method of manufacturing a base-frame assembly, comprising:
- casting a plurality of mounting towers for supporting an engine-driven generator, wherein at least one tower of the plurality of mounting towers comprises an upper portion integrally coupled to a plurality of ribs as a one-piece structure, and the plurality of ribs extend from the upper portion in a crosswise direction relative to the upper portion;
- coupling a vibration damper to at least one tower of the plurality of mounting towers; and
- coupling the plurality of mounting towers to a support frame by attaching a female joint portion, a male joint portion, or a combination thereof, of each respective mounting tower of the plurality of mounting towers to a beam of the support frame.

* * * * *